US012707189B2

(12) United States Patent
Yamaoka et al.

(10) Patent No.: US 12,707,189 B2
(45) Date of Patent: Aug. 11, 2026

(54) DISPLAY DEVICE

(71) Applicants: Sony EMCS (Malaysia) Sdn. Bhd., Bandar Baru Bangi (MY); Sony Group Corporation, Tokyo (JP)

(72) Inventors: Daisuke Yamaoka, Tokyo (JP); Ismail Bin Mohd Zahidin, Selangor (MY); Dzul Asyraff Firdhaus Mustaffa Kamal, Putrajaya (MY); Huai Ern Chew, Negeri Sembilan (MY)

(73) Assignees: Sony EMCS (Malaysia) Sdn. Bhd., Selangor (MY); Sony Group Corporation, Tokyo (JP)

( * ) Notice: Subject to any disclaimer, the term of this patent is extended or adjusted under 35 U.S.C. 154(b) by 139 days.

(21) Appl. No.: 18/848,453

(22) PCT Filed: Mar. 14, 2023

(86) PCT No.: PCT/JP2023/009770
§ 371 (c)(1),
(2) Date: Sep. 18, 2024

(87) PCT Pub. No.: WO2023/182068
PCT Pub. Date: Sep. 28, 2023

(65) Prior Publication Data
US 2025/0211893 A1 Jun. 26, 2025

(30) Foreign Application Priority Data
Mar. 25, 2022 (JP) ................................ 2022-050854

(51) Int. Cl.
*H04R 1/26* (2006.01)
*H04R 1/02* (2006.01)
(Continued)

(52) U.S. Cl.
CPC ............... *H04R 1/26* (2013.01); *H04R 1/028* (2013.01); *H04R 7/045* (2013.01); *H04R 17/00* (2013.01); *H04R 2499/15* (2013.01)

(58) Field of Classification Search
CPC .......... H04R 1/26; H04R 1/028; H04R 7/045; H04R 2499/15; H04R 5/02
(Continued)

(56) References Cited

U.S. PATENT DOCUMENTS 6,332,029 B1 * 12/2001 Azima .................. H04R 1/021 381/337
2014/0241558 A1 * 8/2014 Yliaho .................... H04R 5/02 381/333

FOREIGN PATENT DOCUMENTS

JP 2007267302 A 10/2007
JP 2011035552 A 2/2011
(Continued)

OTHER PUBLICATIONS

International Search Report for Application No. PCTJP2023009770 mailed Jun. 6, 2023; 3 pgs.

*Primary Examiner* — Thjuan K Addy
(74) *Attorney, Agent, or Firm* — Lerner David LLP

(57) ABSTRACT

A display device includes a display unit including a flat panel that displays an image, and an output unit that is arranged on a back surface of the flat panel and outputs sound by driving of a plurality of vibration exciters, which vibrates the flat panel, and left and right two cone-shaped speakers. The vibration exciters includes one vibrating element arranged near a center of the flat panel, a first piezo element arranged on a left side when facing the display device, and a second piezo element arranged on a right side when facing the display device.

4 Claims, 8 Drawing Sheets

(51) Int. Cl.

| | |
|---|---|
| ***H04R 5/02*** | (2006.01) |
| ***H04R 7/04*** | (2006.01) |
| ***H04R 17/00*** | (2006.01) |

(58) Field of Classification Search
USPC .................. 381/333, 87, 332, 388, 306, 301
See application file for complete search history.

(56) References Cited

FOREIGN PATENT DOCUMENTS

| | | | |
|---|---|---|---|
| WO | 2010071008 | A1 | 6/2010 |
| WO | 2018123310 | A1 | 7/2018 |
| WO | 2020141581 | A1 | 7/2020 |

* cited by examiner

| INCH | x-POSITION | y-POSITION |
|---|---|---|
| 55 | 80% | 81% |
| 65 | 68% | 70% |
| 77 | 76% | 75% |

(LOCATION OF (2) POSITION)

PIEZO HORIZONTAL CONDITION

| INCH | WOOFER TO PIEZO (a) | WOOFER TO EXCITER (b) |
|---|---|---|
| 55 | 570 | 530 |
| 65 | 570 | 530 |
| 77 | 755 | 680 |

[mm]

DISPLAY DEVICE

CROSS-REFERENCE TO RELATED APPLICATIONS

This application is a national phase entry under 35 U.S.C. § 371 of International Application No. PCT/JP2023/009770 filed Mar. 14, 2023, which claims the priority from Japanese Patent Application No. 2022-050854 filed in the Japanese Patent Office on Mar. 25, 2022, the entire contents of which are hereby incorporated by reference.

FIELD

The present disclosure relates to a display device including a flat panel speaker.

BACKGROUND

In a display device such as a television, a flat panel speaker including a flat panel and a plurality of vibration exciters that vibrate the flat panel has been proposed. The flat panel speaker outputs sound by generating vibration in the flat panel by the vibration exciter.

CITATION LIST

Patent Literature

Patent Literature 1: WO 2018/123310 A

SUMMARY

Technical Problem

A flat panel speaker in which an exciter is used as a vibration exciter tends to have low ability to reproduce a high sound range. In a small display device such as a smartphone, a flat panel speaker using a piezo element is also proposed to compensate for a high sound range. However, in order to adopt a flat panel speaker using a piezo element for a large display device such as a television, a position of arrangement of the piezo element on a flat panel and a direction of installation of the piezo element are issues to realize an excellent sound output.

In addition, in a case where the flat panel speaker includes a plurality of vibration exciters, it is necessary to adjust sounds in such a manner that the sounds respectively output therefrom do not interfere with each other.

The present disclosure proposes a display device capable of solving these issues and realizing an excellent sound output.

Solution to Problem

A display device according to one embodiment of the present disclosure includes display unit including a flat panel that displays an image, and an output unit that is arranged on a back surface of the flat panel and outputs sound by driving of a plurality of vibration exciters, which vibrates the flat panel, and left and right two cone-shaped speakers. The vibration exciters includes one vibrating element arranged near a center of the flat panel, a first piezo element arranged on a left side when facing the display device, and a second piezo element arranged on a right side when facing the display device. The vibrating element, the first piezo element, and the second piezo element are arranged in such a manner that a difference between a distance from the vibrating element to the left cone-shaped speaker and a distance from the first piezo element to the left cone-shaped speaker is within a predetermined range, and a difference between a distance from the vibrating element to the right cone-shaped speaker and a distance from the second piezo element to the right cone-shaped speaker is within the predetermined range.

DESCRIPTION OF EMBODIMENTS

Hereinafter, embodiments will be described in detail with reference to the drawings. Note that in each of the following embodiments, the same parts are denoted by the same reference sign, and redundant description will be omitted.

The present disclosure will be described according to the following order of items.

1. Embodiment
   1-1. Configuration of a display device according to the embodiment
   1-2. Arrangement of piezo elements
   1-3. Arrangement of each output unit
   1-4. Output control processing according to the embodiment
2. Other embodiments
3. Effect of the display device according to the present disclosure
4. Hardware configuration

1. Embodiment (1-1. Configuration of a Display Device According to the Embodiment)

Figure 1:
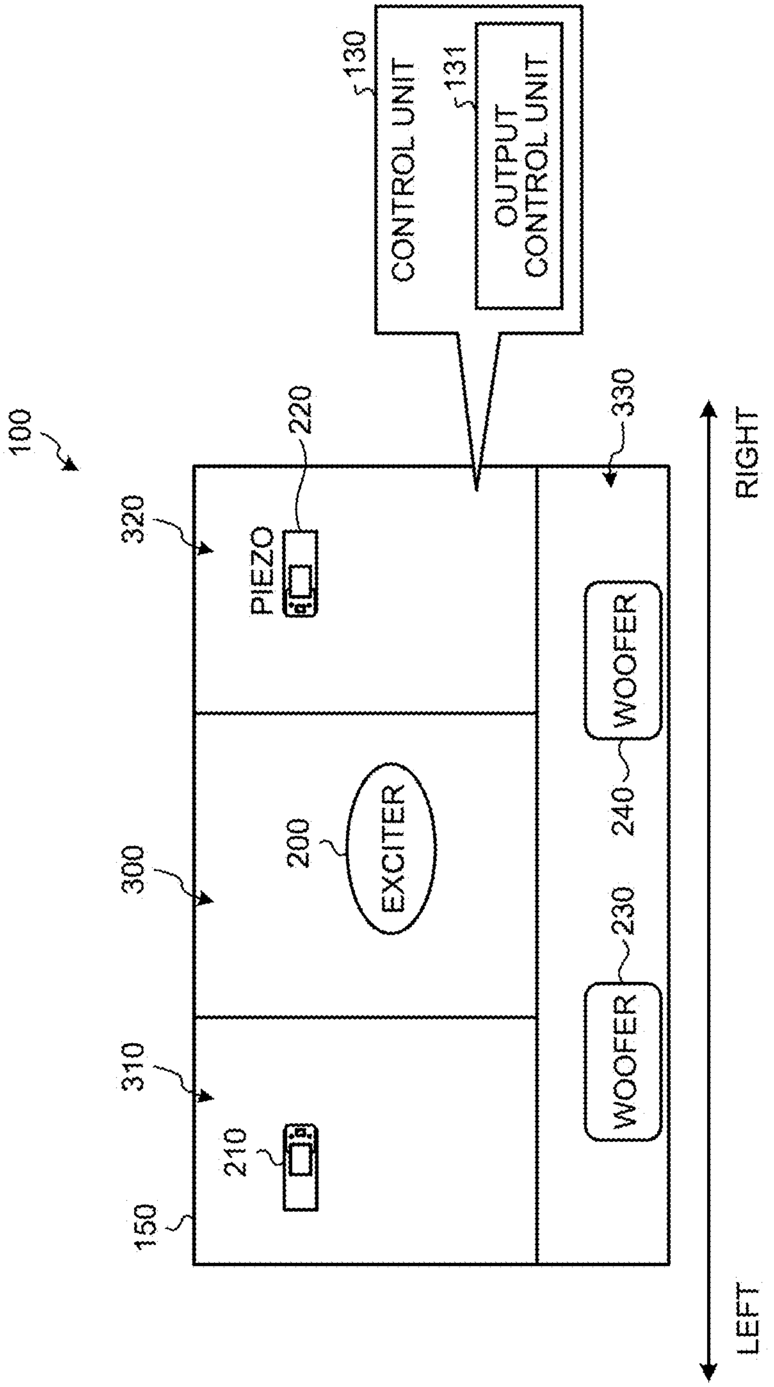
FIG. 1 is a view illustrating a display device according to an embodiment.

A configuration of a display device 100 according to the embodiment is illustrated in FIG. 1. The display device 100 includes a display unit including a flat panel that displays an image. In addition, the display device 100 includes an output unit that is arranged on a back surface of the flat panel 150 and that outputs sound by driving of a plurality of vibration exciters, which vibrates the flat panel 150, and two cone-shaped speakers.

The vibration exciters include two piezo elements for a high sound range output, and one vibrating element (such as exciter) for a middle sound range output. As illustrated in FIG. 1, on the back surface of the flat panel 150, the two piezo elements are respectively arranged on left and right sides with an exciter 200, which is the vibrating element, being the center, and are arranged above the exciter 200 in a height direction.

Specifically, the display device 100 includes, as the plurality of vibration exciters, the exciter 200 that is one vibrating element arranged in a vicinity of a center of the flat panel 150, a first piezo element 210 arranged on the left when facing the display device, and a second piezo element 220 arranged on the right when facing the display device.

In the display device 100, the two piezo elements mainly output a high sound range. In addition, the vibrating element mainly outputs a middle sound range. In addition, a left woofer 230 and right woofer 240, which are two cone-shaped speakers arranged on the left and right sides, mainly output the middle sound range and a low sound range.

Note that as illustrated in FIG. 1, the left woofer 230 and the right woofer 240 are respectively arranged on the left and right with the exciter 200 as the center, and are arranged below the flat panel 150. For example, the left woofer 230 is arranged on the left side of the center when facing the display device 100 and below the center of the flat panel 150. The right woofer 240 is arranged on the right side of the center when facing the display device 100 and below the center of the flat panel 150.

The flat panel 150 is divided into a first section 300 in which the exciter 200 is arranged, a second section 310 in which the first piezo element 210 is arranged, a third section 320 in which the second piezo element 220 is arranged, and a fourth section 330 in which the left woofer 230 and the right woofer 240 are arranged.

The flat panel 150 is divided by a damping member that is fixed to the back surface of the flat panel 150 and referred to as an enclosure tape, for example. As an example, as illustrated in FIG. 1, the first section 300, the second section 310, and the third section 320 are divided in such a manner as to be regions that divide a horizontal direction of the flat panel 150 by approximately one third.

As illustrated in FIG. 1, the display device 100 restricts a range, in which the flat panel 150 vibrates, by an arrangement of the vibration exciters in the different sections, and controls generation of unnecessary vibration.

(1-2. Arrangement of Piezo Elements)

Incidentally, in the display device 100, the piezo elements mainly responsible for the high sound range easily affect output sound depending on an installation position and an installation direction. This is because a sense of hearing of a person is more sensitive to localization of sound in the higher sound range, or an element is likely to be affected by rigidity or the like of an installed vibrator (flat panel 150 in the present disclosure) in the high sound range, for example. Thus, in the display device 100, the piezo elements are desirably arranged at optimum positions in the sound output.

Specifically, it is desirable that the first piezo element 210 and the second piezo element 220 are arranged in a manner of avoiding the center in both the horizontal direction and an up-down direction in the vibrating sections in such a manner that a standing wave is not generated. That is, the first piezo element 210 is arranged in a manner of avoiding the center in both the horizontal direction and the up-down direction in the second section 310. In addition, the second piezo element 220 is arranged in a manner of avoiding the center in both the horizontal direction and the up-down direction in the third section 320.

Figure 2:
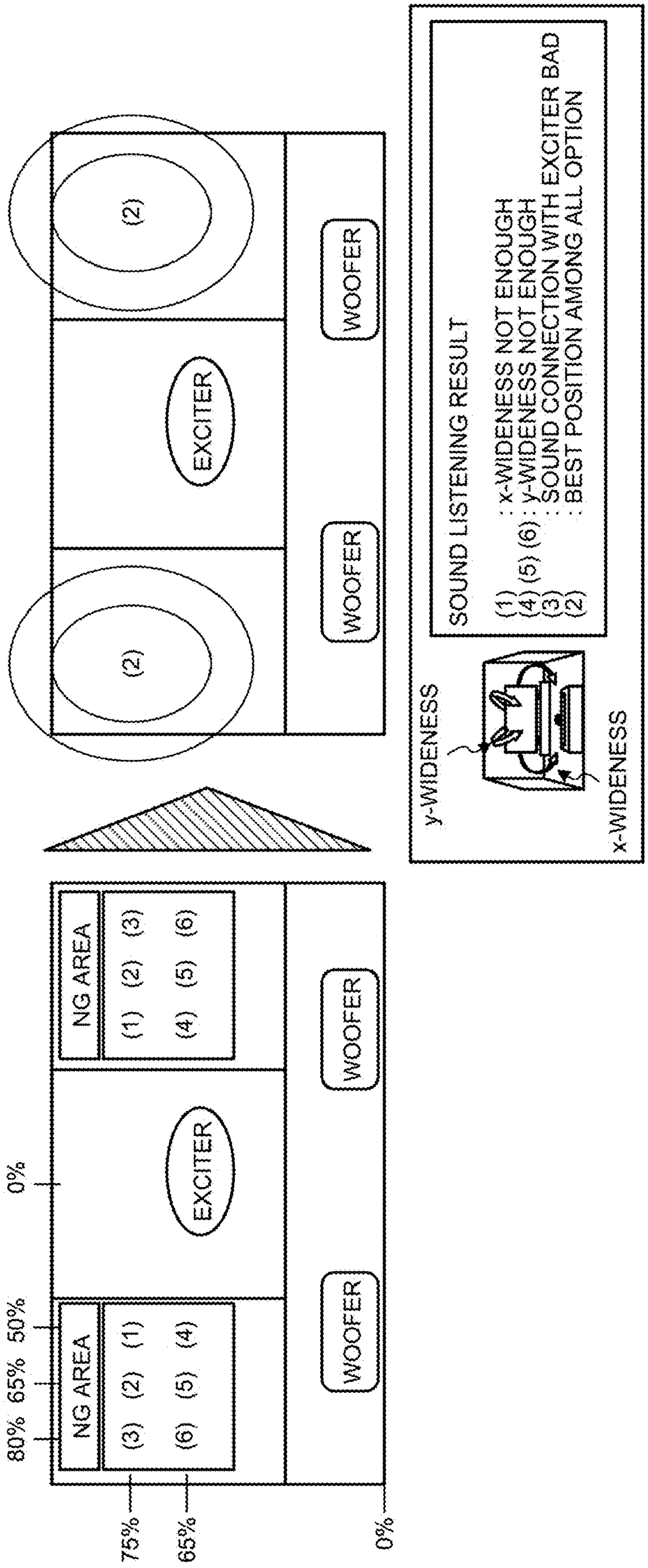
FIG. 2 is a view illustrating an example of an arrangement of piezo elements.

An example of an arrangement of the piezo elements is illustrated in FIG. 2. For example, the first piezo element 210 may be installed at any of positions (1) to (6) illustrated in FIG. 2 in the second section 310. Among them, the first piezo element 210 is desirably installed, for example, in the position (2) illustrated in FIG. 2 on the basis of a spread of sound in a vertical direction, a spread of the sound in a lateral direction, hardness in generation of the standing wave, and the like. Specifically, the first piezo element 210 is arranged at a distance at which a horizontal distance from the center of the flat panel is about 68% to 80% of a case where the horizontal distance from the center to an end in the horizontal direction of the flat panel 150 is 100%. In addition, the first piezo element 210 is arranged at a height of about 70% to 81% of a case where the height from a lower end to an upper end of the flat panel 150 is 100%. Note that in any of the positions (1) to (6) illustrated in FIG. 2, the first piezo element 210 and the second piezo element 220 are installed at positions higher than the exciter 200 in the height direction.

Figures 3, 4:
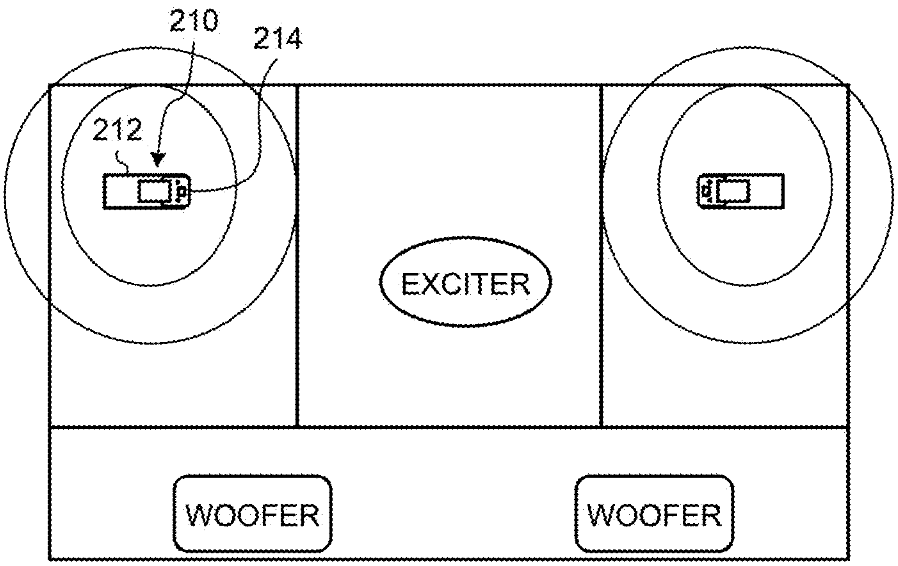
FIG. 3 is a view illustrating an example of a relationship between the number of inches of a flat panel and positions where the piezo elements are arranged.
FIG. 4 is a view illustrating an example of a direction in which the piezo elements are installed.

An example of a relationship between the number of inches of the flat panel 150 and positions where the piezo elements are arranged is illustrated in FIG. 3. Specifically, the relationship between the number of inches of the flat panel 150 and the positions where the first piezo element 210 and the second piezo element 220 are desirably arranged (position of (2) illustrated in FIG. 2) is illustrated in FIG. 3. As illustrated in FIG. 3, for example, in a case where the flat panel 150 has a size of 55 inches, the first piezo element 210 and the second piezo element 220 are desirably arranged at a distance at which the horizontal distance is about 80% from the center of the flat panel 150 toward the outside. Furthermore, the first piezo element 210 and the second piezo element 220 are desirably arranged at a distance of about 81% from the lower end of the flat panel 150 in the height direction.

Next, a direction in which the piezo elements are installed will be described with reference to FIG. 4. FIG. 4 is a view illustrating an example of the direction in which the piezo elements are installed. Note that each of the piezo elements according to the present disclosure has a substantially rectangular shape including a base portion and an excitation portion. For example, as illustrated in FIG. 4, the first piezo element 210 includes an excitation portion 212 that applies vibration according to a voltage, and a base portion 214 that controls the voltage. The excitation portion 212 and the base portion 214 are connected by a connector.

In a case where the piezo elements are installed in the display device 100 according to the present disclosure, it is desirable that the piezo elements are arranged in such a manner that a longitudinal direction thereof is lateral to be parallel to the longitudinal direction of the flat panel 150, and the excitation portion is arranged close to the outside of the flat panel 150. The direction is determined in consideration of the spread in the vertical direction and the spread in the lateral direction of the sound output on the basis of the vibration of the piezo elements.

Figure 5:
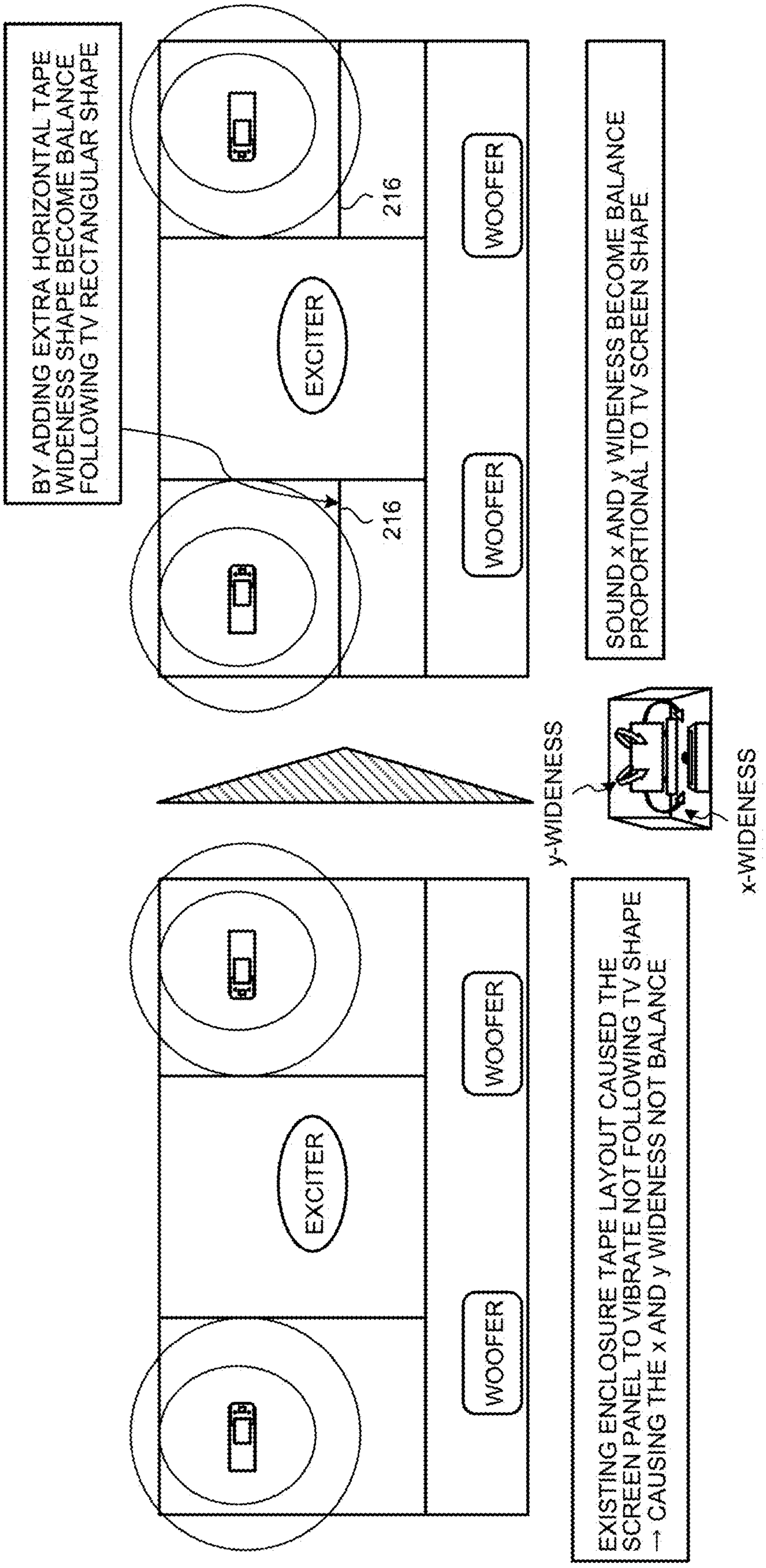
FIG. 5 is a view illustrating an arrangement example of an additional enclosure tape.

Furthermore, the display device 100 may include additional enclosure tapes 216 in such a manner that the sections where the piezo elements are arranged become narrower. An arrangement example of the additional enclosure tapes 216 is illustrated in FIG. 5. For example, the display device 100 includes the additional enclosure tape 216 (second damping member) to further narrows down each of the second section 310 and the third section 320 at a lower portion away from the position of each of the two piezo elements for a predetermined distance. For example, the display device 100 includes the additional enclosure tape 216 at a position about 80 to 100 mm away from the position of each of the two piezo elements in a manner parallel to the longitudinal direction of the flat panel 150. As described above, by limiting the regions of the flat panel 150 which regions are vibrated by the piezo elements, the display device 100 can control generation of an unnecessary standing wave and can output a sound suitable for rigidity of the flat panel 150.

(1-3. Arrangement of Each Output Unit)

Furthermore, the display device 100 may optimize not only grounding positions and the direction of the piezo elements but also the positional relationship among the piezo elements, the exciter 200, and the left and right woofers. That is, the display device 100 can improve a synthetic frequency characteristic of the output sound and improve a sense of localization and sound quality by optimizing the position of each of the elements included in the output unit.

In the present disclosure, the display device 100 has a three-channel sound output structure of a sound of a center channel which sound is output from the exciter 200 and sounds of left and right channels which sounds are output from the piezo elements. In this case, in the center channel, the sound is output by a combination of the exciter 200 and the left and right woofers. In addition, the sound is output by a combination of the first piezo element 210 and the left woofer 230 in the left channel. In addition, the sound is output by a combination of the second piezo element 220 and the right woofer 240 in the right channel.

That is, the left and right woofers output sounds of both the center channel and one of the left or right channel. Processing such as delay is performed on the sound of the center channel and the sounds of the left and right channels in order to correct a deviation at a viewing point. Since an output of each of the woofers is one, when the deviation becomes too large, there is a possibility that a problem in a sense of hearing is generated in such a manner that the sound seems to be deviated at the viewing point. Thus, the display device 100 according to the present disclosure reduces feeling of strangeness of a listener of the sound by devising the arrangement of the positional relationship of the output units that are the exciter 200, the piezo elements, and the woofers. The positional relationship between the output units will be described below with reference to FIG. 6.

Figures 6, 7:
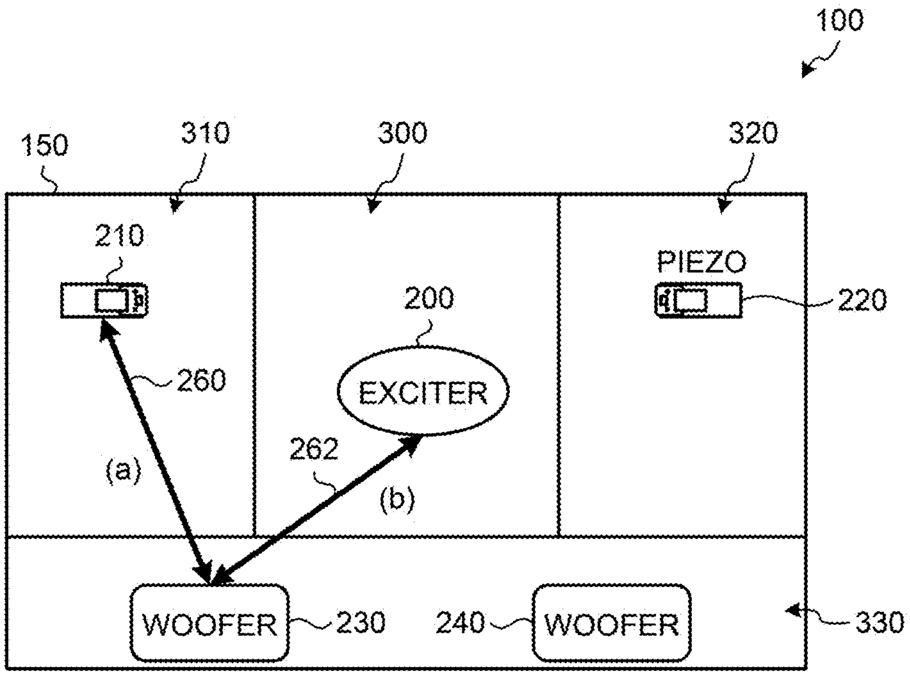
FIG. 6 is a view illustrating an example of an arrangement of vibration exciters and woofers.
FIG. 7 is a view illustrating an example of a distance between each of the vibration exciters and the woofers.

An example of the arrangement of each of the vibration exciters and the woofers is illustrated in FIG. 6. As illustrated in FIG. 6, the exciter 200 and the first piezo element 210 are arranged in such a manner that a difference between a distance 260 (line (a) illustrated in FIG. 6) from the exciter 200 to the left woofer 230 and a distance 262 (line (b) illustrated in in FIG. 6) from the first piezo element 210 to the left woofer 230 falls within a predetermined range.

Similarly, the exciter 200 and the second piezo element 220 are arranged in such a manner that a difference between a distance from the exciter 200 to the right woofer 240 and a distance from the second piezo element 220 to the right woofer 240 falls within a predetermined range.

Specifically, the first piezo element 210 is desirably arranged at a position where the difference between the distance 260 from the exciter 200 to the left woofer 230 and the distance 262 from the first piezo element 210 to the left woofer 230 is within 10% of a length of the distance 260 (or a length of the distance 262).

Similarly, the second piezo element 220 is desirably arranged at a position where the difference between the distance from the exciter 200 to the right woofer 240 and the distance from the second piezo element 220 to the right woofer 240 is within 10% of the distance from the second piezo element 220 to the right woofer 240.

An example of a distance between each of the vibration exciters and the woofers is illustrated in FIG. 7. As illustrated in FIG. 7, for example, in a case where the flat panel 150 has a size of 55 inches, it is desirable that the distance from the first piezo element 210 to the left woofer 230 is 570 mm and the distance from the exciter 200 to the left woofer 230 is 530 mm. As illustrated in such an example, the difference between the distances is within 10% of the distance from the first piezo element 210 to the left woofer 230 or the distance from the exciter 200 to the left woofer 230.

That is, by making the distance between the woofer and the exciter 200 and the distance between the woofer and the piezo element substantially the same as described above, the display device 100 can reduce the deviation of the output sound, and can realize a sound output that gives no sense of strangeness in terms of the sense of hearing.

(1-4. Output Control Processing According to the Embodiment)

Next, processing in which the display device 100 adjusts sound output from the flat panel 150 will be described. As illustrated in FIG. 1, the display device 100 includes a control unit 130, and adjusts sound, which is output from the output unit, by signal processing or the like executed by the control unit 130.

Note that the control unit 130 is realized by, for example, a central processing unit (CPU), a micro processing unit (MPU), a graphics processing unit (GPU), or the like executing a program (such as a signal processing program according to the present disclosure) stored inside the display device 100 with a random access memory (RAM) or the like as a work area. Furthermore, the control unit 130 is a controller, and may be realized by, for example, an integrated circuit such as an application specific integrated circuit (ASIC) or a field programmable gate array (FPGA).

The control unit 130 includes an output control unit 131 that performs control to output sound from the output unit such as the vibration exciter or the woofers. The output control unit 131 controls a sound signal output from the center channel (exciter 200) and sound signals output from the left and right channels (first piezo element 210 and second piezo element 220). That is, the display device 100 is a sound output device including three sound output channels. Note that the signal of the center channel among the three channel outputs is output by the exciter 200 and the left and right woofers in the display device 100. Furthermore, in the display device 100, the signals of the left and right (LR) channels among the three channel outputs are output by the left and right piezo elements and the left and right woofers.

In such a three-channel sound output mechanism, it is required to adjust an output value and a frequency band of an output signal by using signal processing. This is because the output of the center channel needs to be higher than that of the left and right channels in the three-channel reproduction as compared with conventional two-channel reproduction. That is, in the conventional two-channel reproduction, the sounds of the left and right channels are synthesized at the viewing point (for example, in front of the display device 100). As a result, in a sense of hearing, the viewer listens to sound larger than sound output in a single channel. However, in the three-channel sound output mechanism, since the center channel is responsible for sound to be localized at the center of the screen, the center channel is required to output sound larger than signals output from the conventional left and right channels. For example, in a case where the viewing point is at the same distance from each of the left and right channels, the sound at the viewing point is heard to be larger than the sound emitted from each of the channels by about three decibels. Thus, it is necessary for the center channel to output sound larger than the sounds output from the left and right channels by three decibels.

Here, since the vibrating element such as the exciter 200 has a limitation on the high sound range that can be output, processing such as electrically amplifying the high sound range is usually performed at the time of output. However, as the output value increases, the vibrating element gradually reaches the output limit from the high sound range, and has a frequency characteristic that attenuate from the high sound range. Thus, when an attempt is made to output sound larger than the conventional sound in the center channel, there is a possibility that a sound in which accurate frequency characteristic is not obtained specifically in the high sound range is output.

Thus, the output control unit 131 distributes the signal output from the center channel to the left and right channels in accordance with the frequency characteristic of the center channel in which characteristic the output is gradually attenuated as the output value of the center channel increases. As a result, the output control unit 131 can flatten the frequency characteristic of the center channel even a case of the high output value.

Figure 8:
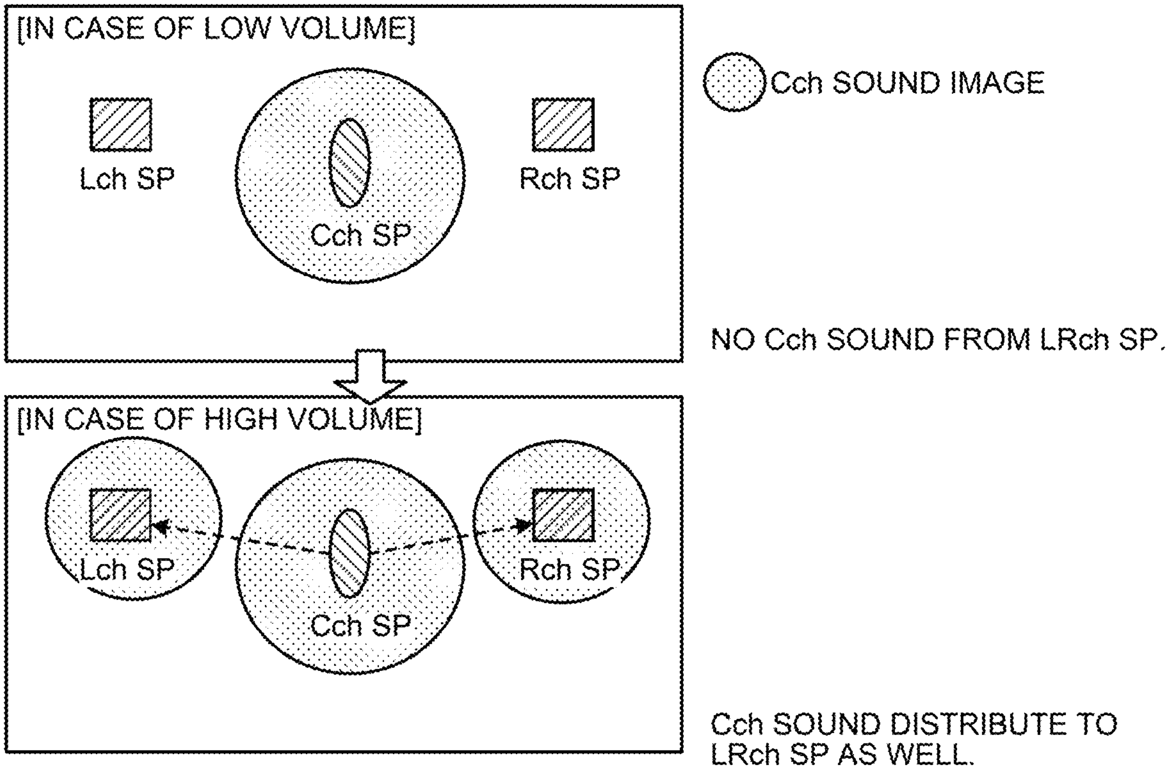
FIG. 8 is a view schematically illustrating a situation in which a three-channel sound is output.

This point will be described with reference to FIG. 8. A situation in which the three-channel sound is output is schematically illustrated in FIG. 8. As illustrated in FIG. 8, in a case where the volume to be output is low, that is, in a volume range in which a reasonable output can be performed by the center channel in the high sound range, the display device 100 outputs the signal to be output from the center channel only from the center channel.

On the other hand, in a case where the output volume gradually increases, that is, when the center channel reaches the output limit in the high sound range, the display device 100 distributes the signal to be output from the center channel to the left and right channels, and also outputs the center channel signal from the left and right channels.

As a result, the output control unit 131 can flatten the frequency characteristic of the center channel even in a case of the high output value, and can perform the appropriate output.

Figure 9:
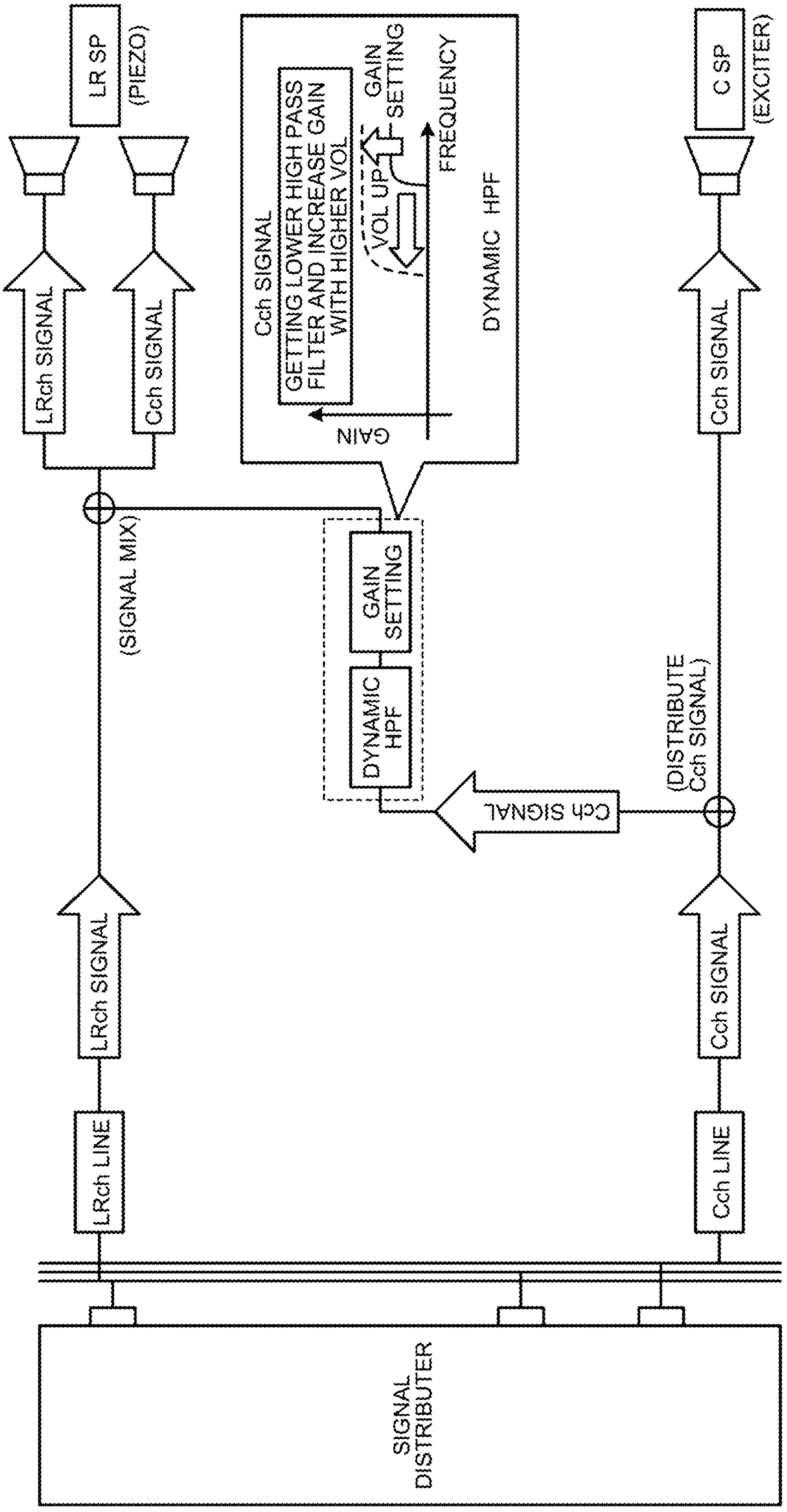
FIG. 9 is a view illustrating a flow of sound signal distribution processing.

This point will be described with reference to FIG. 9. FIG. 9 is a view illustrating a flow of sound signal distribution processing.

As illustrated in FIG. 9, when acquiring a sound signal to be reproduced, the display device 100 first distributes the sound signal in such a manner that the sound signal can be output through three channels. Specifically, the display device 100 separates the signal of the center channel and the signals of the left and right channels into separate paths.

Furthermore, as illustrated in FIG. 9, with respect to the signal of the center channel, the display device 100 separates the path into the signal output from a center speaker and the sound signals distributed to the left and right channels (corresponding to "Distribute Cch signal" illustrated in FIG. 9).

Then, the output control unit 131 according to the display device 100 executes predetermined signal processing on the signals distributed to the left and right channels. Specifically, the display device 100 varies the amount of the signal to be distributed of the center channel and the frequency band of the sounds output by the left and right channels according to the volume (gain). That is, the distribution amount (output value) and the frequency bandwidth of the signal of the center channel which signal is output by the left and right channels change in conjunction with the output value (volume or the like).

For example, the output control unit 131 distributes the signal of the center channel to the left and right channels by using a high-pass filter in which a transmitted frequency band changes according to the output value.

That is, the output control unit 131 controls each of the signals output from the piezo elements and the signal output from the exciter 200. In addition, the output control unit 131 distributes a part of the signal output from the exciter 200 to the output to the piezo elements according to the output value of the signal output from the exciter 200.

Specifically, according to the output value of the signal output from the exciter 200, the output control unit 131 changes the frequency band of the signal to be distributed to the output to the piezo elements in the signal output from the exciter 200. For example, as the output value of the signal output from the exciter 200 increases, the output control unit 131 widens the frequency band of the signal to be distributed to the output to the piezo elements in the signal output from the exciter 200.

Such control will be described with a graph indicating a behavior of a dynamic high-pass filter illustrated in FIG. 9 ("Dynamic HPF" illustrated in FIG. 9). That is, in the dynamic high-pass filter, when gain adjustment ("Gain setting" illustrated in FIG. 9) that is the output value of the signal of the center channel is performed and the output value increases, the frequency band of the transmitted sound is gradually widened. This indicates that a gradual spread of the frequency, at which the output limit is reached, from a high band to a low band in the output of the exciter 200 is in conjunction with an increase of the output value. As described above, through a dynamic high-pass filter that changes the frequency band and the distribution amount of the transmitted sound according to the output value, the output control unit 131 can realize the sound output with no distortion and an overall well-ordered frequency.

That is, the display device 100 mixes the signal of the center channel to the left and right channels while changing the distribution amount and the frequency band according to the output value, whereby balanced signal reproduction is performed by integration of the center channel and the left and right channels. As described above, the display device 100 realizes the optimum sound output by compensating for the frequency band and the signal, which cannot be completely output only by the center channel, with the left and right channels.

2. Other Embodiments

The processing according to each of the embodiments described above may be performed in various different modes other than each of the embodiments described above.

Among pieces of the processing described in each of the above embodiments, all or part of the processing described to be performed automatically can be performed manually, or all or a part of the processing described to be performed manually can be performed automatically by a known method. In addition, the processing procedures, specific names, and information including various kinds of data and parameters described in the document and the drawings can be arbitrarily changed unless otherwise specified. For example, the various kinds of information illustrated in each of the drawings are not limited to the illustrated information.

In addition, each component of each of the devices illustrated in the drawings is functionally conceptual, and is not necessarily configured physically in a manner illustrated in the drawings. That is, a specific form of distribution and integration of each device is not limited to what is illustrated, and all or a part thereof can be functionally or physically distributed and integrated in an arbitrary unit according to various loads, usage conditions, and the like.

In addition, the above-described embodiments and modification examples can be appropriately combined within a range in which processing contents do not contradict each other.

Furthermore, the effects described in the present specification are merely examples and are not limited, and there may be other effects.

3. Effect of the Display Device According to the Present Disclosure

As described above, the display device according to the present disclosure (display device 100 in the embodiment) includes the display unit including the flat panel that displays an image, the output unit that is arranged on the back surface of the flat panel and outputs the sound by driving of the plurality of vibration exciters that vibrates the flat panel, and the output control unit (output control unit 131 in the embodiment) that performs control to output the sound from the output unit. The vibration exciter includes the two piezo elements (first piezo element 210 and second piezo element 220 in the embodiment) for the high sound range output and the one vibrating element (exciter 200 in the embodiment) for the middle sound range output. The output control unit controls each of the signals output from the piezo elements and the signal output from the vibrating element, and distributes a part of the signal output from the vibrating element to the output to the piezo elements according to the output value of the signal output from the vibrating element.

In addition, according to the output value of the signal output from the vibrating element, the output control unit changes the frequency band of the signal distributed to the output to the piezo elements in the signal output from the vibrating element.

In addition, as the output value of the signal output from the vibrating element increases, the output control unit widens the frequency band of the signal distributed to the output to the piezo elements in the signal output from the vibrating element.

As described above, the display device according to the present disclosure outputs the three-channel sound by distributing the signal output from the vibrating element to the piezo elements. At this time, the display device can output the sound, in which the high band that is difficult for the vibrating element to perform the output is compensated, by dynamically distributing the signal output from the vibrating element to the piezo elements according to the output value. In addition, by expanding the frequency band in conjunction with the output value, the display device can dynamically compensate for the output characteristic of the vibrating element in which characteristic the high band gradually reaches the limit as the output value increases, and can keep the frequency band of the sound reproduced in the entire three channels appropriate.

In addition, the two piezo elements according to the display device are arranged on the back surface of the flat panel respectively on the left and right with the vibrating element as the center, and are arranged above the vibrating element in the height direction.

In addition, the display device includes the damping member that is a member that performs division into the first section in which the vibrating element is arranged, the second section in which the first piezo element that is one of the two piezo elements and arranged on the left when facing the display device is arranged, and the third section in which the second piezo element that is one of the two piezo elements and arranged on the right when facing the display device is arranged, the damping member being fixed to the back surface of the flat panel.

In addition, the first piezo element is arranged in a manner of avoiding the center in both the horizontal direction and the up-down direction in the second section. The second piezo element is arranged in a manner of avoiding the center in both the horizontal direction and the up-down direction in the third section.

In addition, each of the two piezo elements has the substantially rectangular shape including the base portion and the excitation portion, and is arranged such a manner that the longitudinal direction is arranged laterally in parallel to the longitudinal direction of the flat panel and the excitation portion is close to the outside of the flat panel.

In addition, the display device further includes the second damping member that further narrows each of the second section and the third section in a lower portion separated from the positions of the two piezo elements for a predetermined distance.

As described above, the display device according to the present disclosure is arranged at a position where the sounds output from the piezo elements spread most. In addition, in the display device, by addition of the second damping member in such a manner as to narrow the sections where the piezo elements are installed, rigidity of the vibrating flat panel is increased, and adjustment is performed in such a manner that a clearer sound is output. As a result, the display device can further improve the quality of the output sound.

In addition, the vibration exciter according to the display device includes the one vibrating element arranged in the vicinity of the center of the flat panel, the first piezo element arranged on the left when facing the display device, and the second piezo element arranged on the right when facing the display device. The vibrating element, the first piezo element, and the second piezo element are arranged in such a manner that the difference between the distance from the vibrating element to the left cone-shaped speaker (left woofer 230 in the embodiment) and the distance from the first piezo element to the left cone-shaped speaker is within a predetermined range, and the difference between the distance from the vibrating element to the right cone-shaped speaker (right woofer 240 in the embodiment) and the distance from the second piezo element to the right cone-shaped speaker is within the predetermined range.

Furthermore, the first piezo element is arranged at the position where the difference between the distance from the vibrating element to the left cone-shaped speaker and the distance from the first piezo element to the left cone-shaped speaker is within 10% of the distance from the first piezo element to the left cone-shaped speaker. The second piezo element is arranged at the position where the difference between the distance from the vibrating element to the right cone-shaped speaker and the distance from the second piezo element to the right cone-shaped speaker is within 10% of the distance from the second piezo element to the right cone-shaped speaker.

In addition, the first piezo element and the second piezo element are arranged above the vibrating element on the back surface of the flat panel.

In addition, the left cone-shaped speaker is arranged on the left side of the center when facing the display device and below the center of the flat panel. The right cone-shaped speaker is arranged on the right side of the center when facing the display device and below the center of the flat panel.

In such a manner, in the display device according to the present disclosure, the distance between the woofers and the exciter and the distance between the woofers and the piezo elements are made substantially the same, whereby the deviation of the output sound can be reduced, and the sound output that gives no sense of strangeness in terms of a sense of hearing can be realized. That is, the display device can improve the synthetic frequency characteristic by the sounds of the speakers of the piezo elements, the exciter, and the woofers, and can improve the sense of localization and the sound quality.

Hardware Configuration

Figure 10:
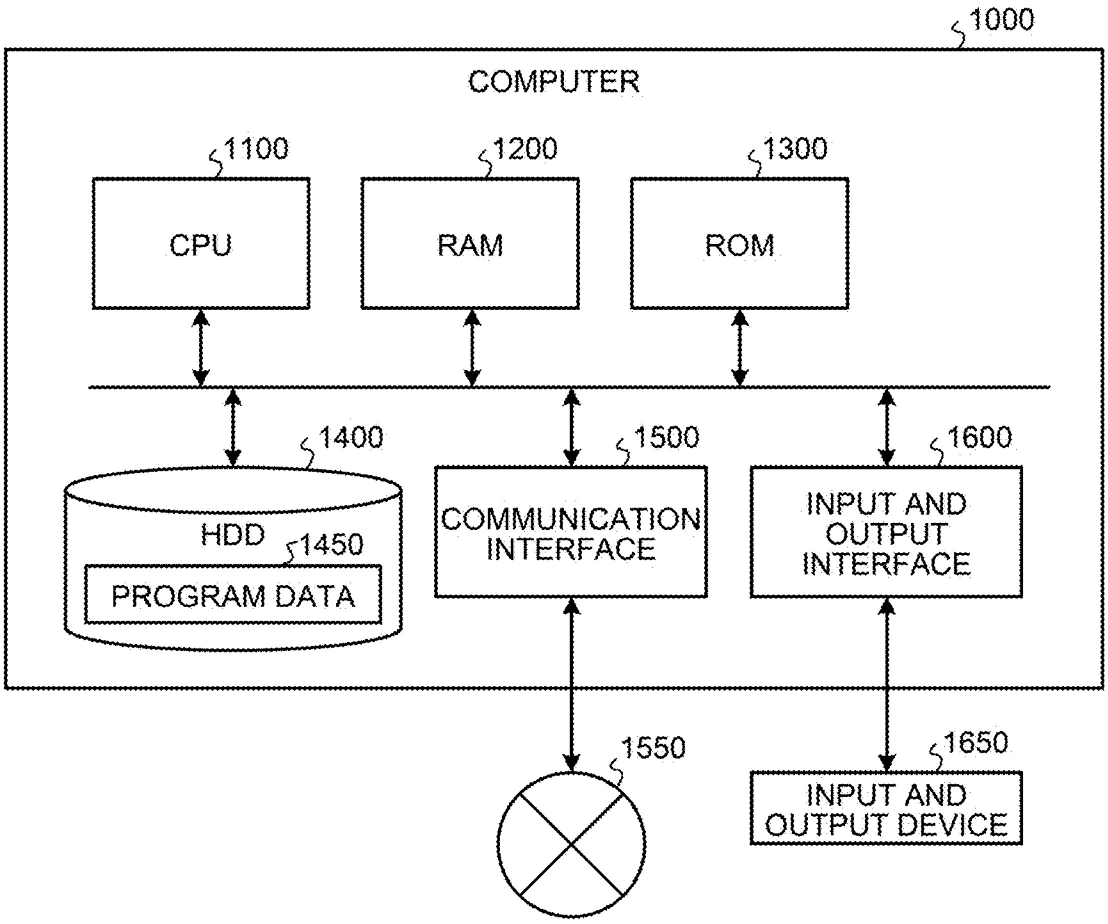
FIG. 10 is a hardware configuration diagram illustrating an example of a computer that realizes functions of the display device.

The information devices such as the display device 100 according to the embodiments described above are implemented by a computer 1000 having a configuration as illustrated in FIG. 12, for example. Hereinafter, the display device 100 according to the embodiment will be described as an example. FIG. 10 is a hardware configuration diagram illustrating an example of the computer 1000 that implements the functions of the display device 100. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processes corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium (medium). A medium refers to, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the display device 100 according to the embodiment, the CPU 1100 of the computer 1000 implements the functions of the control unit 130 or other units by executing an information processing program loaded on the RAM 1200. The HDD 1400 also stores an signal processing program according to the present disclosure. Note that although the CPU 1100 reads the program data 1450 from the HDD 1400 and executes the program data 1450, as another example, the CPU 1100 may acquire these programs from another device via the external network 1550.

Note that the present technology can also have the following configurations.

(1)

A display device comprising:
- a display unit including a flat panel that displays an image;
- an output unit that is arranged on a back surface of the flat panel and outputs sound by driving of a plurality of vibration exciters that vibrates the flat panel; and
- an output control unit that performs control to output sound from the output unit, wherein
- the vibration exciter includes
- two piezo elements for a high sound range output and one vibrating element for a middle sound range output, and
- the output control unit
- controls each of signals output from the piezo elements and a signal output from the vibrating element, and distributes a part of the signal output from the vibrating element to an output to the piezo elements according to an output value of the signal output from the vibrating element.

(2)

The display device according to (1), wherein
- the output control unit
- changes a frequency band of the signal distributed to the output to the piezo elements in the signal output from the vibrating element according to the output value of the signal output from the vibrating element.

(3)

The display device according to (2), wherein
- the output control unit
- widens a frequency band of the signal distributed to the output to the piezo elements in the signal output from the vibrating element as the output value of the signal output from the vibrating element increases.

(4)

A signal processing method comprising
- executing, by a computer including
- a display unit including a flat panel that displays an image, and
- an output unit that is arranged on a back surface of the flat panel, outputs sound by driving of a plurality of vibrating exciters that vibrates the flat panel, and includes two piezo elements for a high sound range output and one vibrating element for a middle sound range output as the plurality of vibration exciters,
- controlling to output the sound from the output unit; and
- controlling each of signals output from the piezo elements and a signal output from the vibrating element, and distributing a part of the signal output from the vibrating element to an output to the piezo elements according to an output value of the signal output from the vibrating element.

(5)

A signal processing program causing a computer including a display unit including a flat panel that displays an image, and an output unit that is arranged on a back surface of the flat panel, outputs sound by driving of a plurality of vibration exciters that vibrates the flat panel, and includes two piezo elements for a high sound range output and one vibrating element for a middle sound range output as the plurality of vibration exciters, to function as an output control unit that performs control to output the sound from the output unit, wherein the output control unit controls each of signals output from the piezo elements and a signal output from the vibrating element, and distributes a part of the signal output from the vibrating element to an output to the piezo elements according to an output value of the signal output from the vibrating element.

(6)

A display device including:

a display unit including a flat panel that displays an image; and an output unit that is arranged on a back surface of the flat panel and outputs sound by driving of a plurality of vibration exciters, which vibrates the flat panel, and two cone-shaped speakers, in which each of the vibration exciters includes two piezo elements for a high sound range output and one vibrating element for a middle sound range output, and the two piezo elements are respectively arranged on left and right sides with the vibrating element as a center on the back surface of the flat panel, and are arranged above the vibrating element in a height direction.

(7)

The display device according to (6), further including a damping member that is a member that performs division into a first section in which the vibrating element is arranged, a second section in which a first piezo element that is one of the two piezo elements and arranged on the left when facing the display device is arranged, and a third section in which a second piezo element that is one of the two piezo elements and arranged on the right when facing the display device is arranged, the damping member being fixed to the back surface of the flat panel.

(8)

The display device according to (7), in which the first piezo element is arranged in a manner of avoiding a center in both a horizontal direction and an up-down direction in the second section, and the second piezo element is arranged in a manner of avoiding a center in both the horizontal direction and the up-down direction in the third section.

(9)

The display device according to any one of (6) to (8), in which each of the two piezo elements has a substantially rectangular shape including a base portion and an excitation portion, and is arranged in such a manner that a longitudinal direction is arranged laterally in parallel to a longitudinal direction of the flat panel and the excitation portion is close to outside of the flat panel.

(10)

The display device according to (7) or (8), further including a second damping member that further narrows each of the second section and the third section in a lower portion away from positions of the two piezo elements for a predetermined distance.

(11)

A display device including:

a display unit including a flat panel that displays an image; and an output unit that is arranged on a back surface of the flat panel and outputs sound by driving of a plurality of vibration exciters, which vibrates the flat panel, and left and right two cone-shaped speakers, in which each of the vibration exciters includes one vibrating element arranged near a center of the flat panel, a first piezo element arranged on a left side when facing the display device, and a second piezo element arranged on a right side when facing the display device, and the vibrating element, the first piezo element, and the second piezo element are arranged in such a manner that a difference between a distance from the vibrating element to the left cone-shaped speaker and a distance from the first piezo element to the left cone-shaped speaker is within a predetermined range, and a difference between a distance from the vibrating element to the right cone-shaped speaker and a distance from the second piezo element to the right cone-shaped speaker is within the predetermined range.

(12)

The display device according to (11), in which the first piezo element is arranged in a position in which the difference between the distance from the vibrating element to the left cone-shaped speaker and the distance from the first piezo element to the left cone-shaped speaker is within 10% of the distance from the first piezo element to the left cone-shaped speaker, and the second piezo element is arranged in a position in which the difference between the distance from the vibrating element to the right cone-shaped speaker and the distance from the second piezo element to the right cone-shaped speaker is within 10% of the distance from the second piezo element to the right cone-shaped speaker.

(13)

The display device according to (11) or (12), in which the first piezo element and the second piezo element are arranged above the vibrating element on the back surface of the flat panel.

(14)

The display device according to any one of (11) to (13), in which the left cone-shaped speaker is arranged on a left side of a center in a case of facing the display device and below a center of the flat panel, and the right cone-shaped speaker is arranged on a right side of the center in a case of facing the display device and below the center of the flat panel.

REFERENCE SIGNS LIST

100 DISPLAY DEVICE
130 CONTROL UNIT
131 OUTPUT CONTROL UNIT
150 FLAT PANEL
200 EXCITER
210 FIRST PIEZO ELEMENT
212 EXCITATION PORTION
214 BASE PORTION
216 ENCLOSURE TAPE
220 SECOND PIEZO ELEMENT
230 LEFT WOOFER
240 RIGHT WOOFER
300 FIRST SECTION
310 SECOND SECTION
320 THIRD SECTION
330 FOURTH SECTION

The invention claimed is:

1. A display device including:

a display unit including a flat panel that displays an image; and an output unit that is arranged on a back surface of the flat panel and outputs sound by driving of a plurality of vibration exciters, which vibrates the flat panel, and left and right two cone-shaped speakers, in which each of the vibration exciters includes one vibrating element arranged near a center of the flat panel, a first piezo element arranged on a left side when facing the display device, and a second piezo element arranged on a right side when facing the display device, and the vibrating element, the first piezo element, and the second piezo element are arranged in such a manner that a difference between a distance from the vibrating element to the left cone-shaped speaker and a distance from the first piezo element to the left cone-shaped speaker is within a predetermined range, and a difference between a distance from the vibrating element to the right cone-shaped speaker and a distance from the second piezo element to the right cone-shaped speaker is within the predetermined range.

2. The display device according to claim 1, in which the first piezo element is arranged in a position in which the difference between the distance from the vibrating element to the left cone-shaped speaker and the distance from the first piezo element to the left cone-shaped speaker is within 10% of the distance from the first piezo element to the left cone-shaped speaker, and the second piezo element is arranged in a position in which the difference between the distance from the vibrating element to the right cone-shaped speaker and the distance from the second piezo element to the right cone-shaped speaker is within 10% of the distance from the second piezo element to the right cone-shaped speaker.

3. The display device according to claim 2, in which the first piezo element and the second piezo element are arranged above the vibrating element on the back surface of the flat panel.

4. The display device according to claim 3, in which the left cone-shaped speaker is arranged on a left side of a center in a case of facing the display device and below a center of the flat panel, and the right cone-shaped speaker is arranged on a right side of the center in a case of facing the display device and below the center of the flat panel.

* * * * *